July 10, 1956

C. D. LINNENBANK 2,753,680

METHOD FOR MANUFACTURING CHAIN
LINKS HAVING AN INTEGRAL STUD

Filed Jan. 28, 1953

Inventor:
Charles D. Linnenbank
by his Attorneys
Howson &
Howson

United States Patent Office 2,753,680
Patented July 10, 1956

2,753,680

METHOD FOR MANUFACTURING CHAIN LINKS HAVING AN INTEGRAL STUD

Charles D. Linnenbank, Chester, Pa., assignor to Baldt Anchor, Chain and Forge Division of the Boston Metals Company, Chester, Pa., a corporation of Maryland Application January 28, 1953, Serial No. 333,678

2 Claims. (Cl. 59—35)

The present invention relates to new and useful improvements in the manufacture of chain and more particularly to new and useful improvements in the manufacture of welded chain of the type having an integral stud or cross member on each link to prevent the chain from tangling or fouling.

Prior to the present invention chain of this type was manufactured by first forming a link in one integral piece and then cutting completely through a side or end wall of the link. The cut portion of the link was bent upwardly or outwardly to permit the insertion of an adjacent link and then the displaced portion of the link was bent back to substantially its original position and the link was welded. In this prior method of manufacturing chain, the link itself was distorted and weakened by the bending operation thus decreasing the quality and strength of the chain. This distortion of the chain is due to the fact that even though the initial link is made to the exact desired shape, after a portion of the link is once bent or displaced upwardly or outwardly, it can never be returned to its original shape solely by a bending operation and thus the link made by this prior process will not properly fit chain handling mechanisms. The weakening of the link is particularly noticeable when the original link has been forged, since a forging operation sets up a particular crystalline structure in the link which gives it greater strength. Once the link has been bent, this crystalline structure is altered thereby greatly decreasing the strength of an individual link.

With the foregoing in mind, the principal object of the present invention is to provide a novel method of manufacturing chain wherein the links are not weakened while the chain is being assembled.

Another object of the present invention is to provide a novel method of manufactutring chain wherein the body portion of the link does not have to be bent or distorted to permit adjacent links to be inserted therein.

Another object of the present invention is to provide a novel method of manufacturing chain having the features and characteristics set forth which is relatively simplified and entirely efficient and effective in operation and use.

These and other objects of the present invention and the various features and details of the operation thereof are hereinafter more fully set forth and described with reference to the accompanying drawings, in which.

Figure 1:
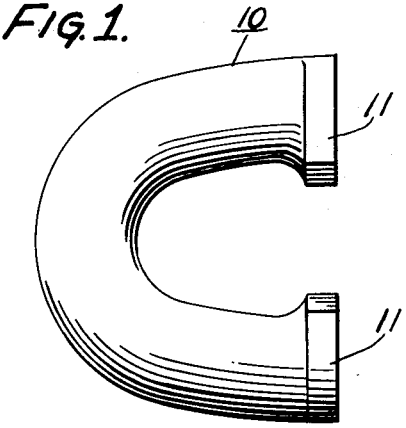
Fig. 1 is a plan view of a link segment made in accordance with the present invention.
Figure 2:
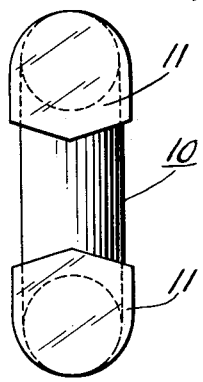
Fig. 2 is an end view of a link segment illustrated in Fig. 1.

Referring more specifically to the drawings and more particularly Figs. 1 and 2 thereof, a single link of the chain produced according to the present invention is formed from a pair of the link segments 10 which are generally U-shaped and have enlarged portions 11, 11 at opposite ends of the legs of the link segment 10. The link segments 10 may be produced by casting, pressing, forging, or other forming processes from any ferrous or non-ferrous metal or material. Preferably, in the manufacture of heavy chain such as anchor chain and the like, the link segments are formed from forged steel so as to have the desired flow lines and crystalline structures which give the metal greater strength compared to the other forming processes.

Figure 3:
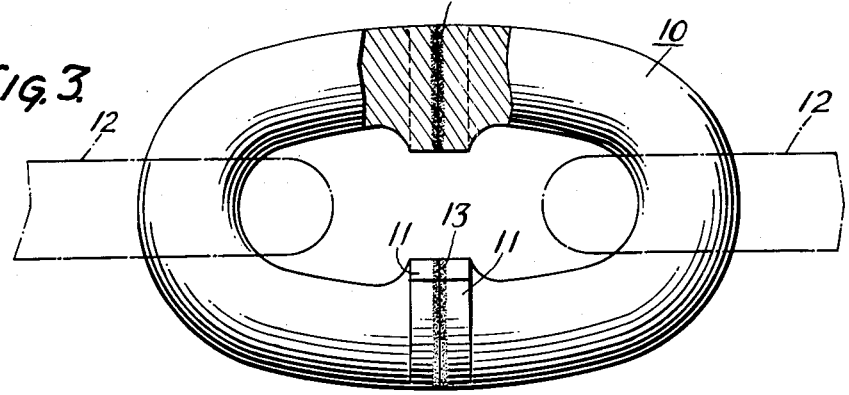
Fig. 3 is a plan view of a segment of chain illustrating two link segments welded together to form a complete link.

To form a chain according to the present invention, a link 12 is inserted in each link segment 10, as illustrated in Fig. 3, and a pair of link segments 10, 10 are positioned with their enlarged end portions 11, 11 in abutting relationship and welded together as illustrated at 13, 13. The links can be successfully welded by all existing processes, however, butt resistance weld is particularly suitable for securing adjacent link segments 10, 10 together.

Figure 4:
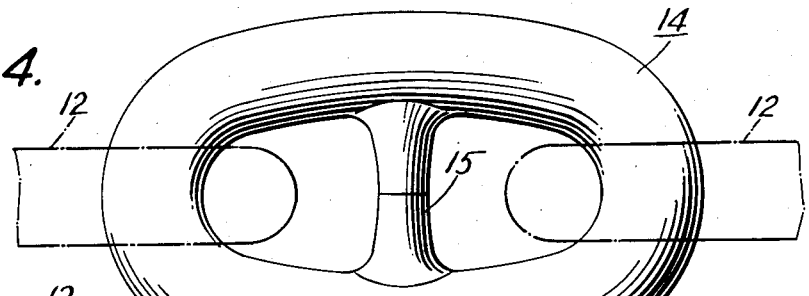
Fig. 4 is a plan view of the chain segment illustrated in Fig. 3 after a subsequent forging operation which completes the formation of the link.
Figure 5:
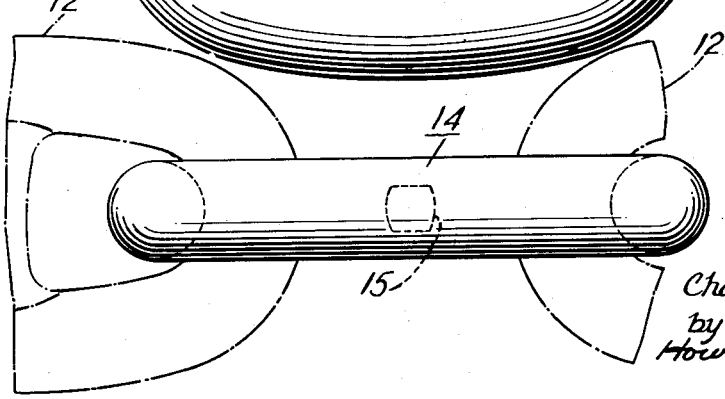
Fig. 5 is a side elevational view of the chain segment illustrated in Fig. 4.

After the welding operation, the two link segments are reforged or reworked at the welded area to produce a completed link 14 as illustrated in Figs. 4 and 5. This subsequent forging or working operation displaces the enlarged end portions 11, 11 on each link segment 10 inwardly at the link 14 to form a stud or cross member 15 therein. The stud or cross member 15 which is formed from the extra metal provided at the enlarged end of each link segment merely serves the purpose of preventing fouling or tangling of the chain and thus does not have to meet as illustrated in Fig. 4, but if desired it may merely extend between opposite sides of the link to such an extent that the adjacent links 12 will be maintained at their respective sides of the link 14.

From the foregoing, it will be observed that the present invention provides a novel method of manufacturing chain wherein adjacent links may be secured together without bending or distorting the links after they have been formed and thereby provides a chain having a greater strength and uniformity of shape.

Where a particular embodiment of the present invention has been illustrated and described herein, it is not intended to limit the invention to such a disclosure and changes and modifications may be incorporated and embodied therein within the scope of the following claims.

I claim:

1. In the manufacture of a chain link having a stud portion extending across the central portion thereof from a pair of generally U-shaped link segments each having the end portions of its legs enlarged to provide projections extending inwardly toward each other with the outer portions of said legs substantially free of projections and with said projections spaced apart a distance greater than the thickness of said segments whereby a similarly sized chain link may be placed between the legs of said segments; the process comprising positioning a pair of said link segments in opposed confronting relation to each other with the enlarged ends of the legs abutting one another axially; butt welding said abutting enlarged ends of said link segments together to unite said legs and the enlarged projections thereon; and thereafter forging said united enlarged ends of the link segments and reducing said enlarged ends to substantially the same size as the remainder of said segments and effecting flow of said enlarged ends inwardly to provide a stud member extending substantially entirely across the space between opposite sides of said link.

2. In the manufacture of a chain link having a stud portion extending across the central portion thereof, the process comprising forming a pair of generally U-shaped link segments each having the end portions of its legs enlarged to provide projections extending inwardly toward each other, while retaining the outer portions of said legs substantially free of projections and with said projections spaced apart a distance greater than the thickness of said segments, whereby a similarly sized chain link may be placed between the legs of said segments; positioning the pair of link segments in opposed confronting relation to each other with the enlarged ends of the legs abutting one another axially; butt welding said abutting enlarged ends of said link segments together to unite said legs and the enlarged projections thereon; and thereafter forging said united enlarged ends of the link segments and reducing said enlarged ends to substantially the same size as the remainder of said segments and effecting flow of said enlarged ends inwardly to provide a stud member extending substantially entirely across the space between opposite sides of said link.

References Cited in the file of this patent

UNITED STATES PATENTS

| | | |
|---|---|---|
| 1,948,349 | Hall | Feb. 20, 1934 |
| 2,247,837 | Gordon | July 1, 1941 |
| 2,304,938 | Lutts et al. | Dec. 15, 1942 |